(12) United States Patent
Hausleitner et al.

(10) Patent No.: US 11,891,056 B2
(45) Date of Patent: Feb. 6, 2024

(54) DEVICE AND METHOD FOR IMPROVING ASSISTANCE SYSTEMS FOR LATERAL VEHICLE MOVEMENTS

(71) Applicant: Bayerische Motoren Werke Aktiengesellschaft, Munich (DE)

(72) Inventors: Bernhard Hausleitner, Arnstorf (DE); Joeran Zeisler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 272 days.

(21) Appl. No.: 17/421,257

(22) PCT Filed: Dec. 10, 2019

(86) PCT No.: PCT/EP2019/084509
§ 371 (c)(1),
(2) Date: Jul. 7, 2021

(87) PCT Pub. No.: WO2020/143977
PCT Pub. Date: Jul. 16, 2020

(65) Prior Publication Data
US 2022/0017084 A1     Jan. 20, 2022

(30) Foreign Application Priority Data

Jan. 8, 2019    (DE) ...................... 10 2019 100 318.0

(51) Int. Cl.
*B60W 30/095*     (2012.01)
*B60W 60/00*     (2020.01)
(Continued)

(52) U.S. Cl.
CPC .......... *B60W 30/095* (2013.01); *B60W 40/09* (2013.01); *B60W 50/14* (2013.01);
(Continued)

(58) Field of Classification Search
CPC .. B60W 30/095; B60W 60/001; B60W 40/09; B60W 50/14; B60W 2552/53;
(Continued)

(56) References Cited

U.S. PATENT DOCUMENTS 9,248,834 B1\*   2/2016   Ferguson .......... B60W 50/0097
10,373,502 B1\*   8/2019   Finnegan ............... G08G 1/167
(Continued)

FOREIGN PATENT DOCUMENTS

CN           108510771 A     9/2018
DE    10 2012 009 297 A1   12/2012
(Continued)

OTHER PUBLICATIONS

International Search Report (PCT/ISA/210) issued in PCT Application No. PCT/EP2019/084509 dated Apr. 21, 2020 with English translation (seven (7) pages).
(Continued)

*Primary Examiner* — Dale W Hilgendorf
*Assistant Examiner* — Hana Lee
(74) *Attorney, Agent, or Firm* — Crowell & Moring LLP

(57) ABSTRACT

A system includes at least one electronic control unit, which performs a method including consecutively or simultaneously, determining a future turning maneuver of the ego vehicle, detecting information relating to the lane markings and the number of available lanes in the environment in front of and next to the ego vehicle, and determining whether at least one further road user is in a relevant lane next to or behind the lane of the ego vehicle. If so, a future intended movement of the road user is determined from the information relating to the lane markings and the number of available lanes. And if it is determined that the ego-vehicle and the road user are on an at least two-lane turning lane, or that the road user stops before the turning maneuver of the (Continued)

ego-vehicle or leaves its lane, it is determined that there is no probability of a collision.

8 Claims, 2 Drawing Sheets

(51) Int. Cl.
*B60W 40/09* (2012.01)
*B60W 50/14* (2020.01)

(52) U.S. Cl.
CPC ..... *B60W 60/001* (2020.02); *B60W 2050/143* (2013.01); *B60W 2552/53* (2020.02); *B60W 2554/4049* (2020.02); *B60W 2555/20* (2020.02)

(58) Field of Classification Search
CPC ..... B60W 2555/20; B60W 2554/4049; B60W 2050/143
See application file for complete search history.

(56) References Cited

U.S. PATENT DOCUMENTS

| | | | |
|---|---|---|---|
| 2017/0101093 A1 | 4/2017 | Barfield, Jr. et al. | |
| 2017/0113683 A1 | 4/2017 | Mudalige et al. | |
| 2017/0291602 A1* | 10/2017 | Newman | B60W 50/14 |
| 2017/0344855 A1* | 11/2017 | Mande | G06V 20/58 |
| 2018/0082589 A1* | 3/2018 | Park | B60W 30/0956 |
| 2020/0039363 A1 | 2/2020 | Degand et al. | |
| 2020/0189574 A1* | 6/2020 | Vignard | B60W 60/00276 |

FOREIGN PATENT DOCUMENTS

| | | |
|---|---|---|
| DE | 10 2012 204 948 A1 | 10/2013 |
| DE | 10 2016 119 486 A1 | 4/2017 |
| DE | 10 2016 121 691 A1 | 5/2018 |
| DE | 10 2016 223 943 A1 | 6/2018 |
| DE | 10 2017 206 695 A1 | 10/2018 |
| EP | 2 950 294 A1 | 12/2015 |

OTHER PUBLICATIONS

German-language Written Opinion (PCT/ISA/237) issued in PCT Application No. PCT/EP2019/084509 dated Apr. 21, 2020 (six (6) pages).

German-language Search Report issued in German Application No. 10 2019 100 318.0 dated Jul. 12, 2019 with partial English translation (14 pages).

Chinese-language Office Action issued in Chinese Application No. 201980088121.7 dated Apr. 1, 2023 with English translation (15 pages).

* cited by examiner

DEVICE AND METHOD FOR IMPROVING ASSISTANCE SYSTEMS FOR LATERAL VEHICLE MOVEMENTS

BACKGROUND AND SUMMARY OF THE INVENTION

The invention relates to a device and a method for improving assistance systems for lateral vehicle movements.

In vehicles, there are a wide variety of systems which are intended to relieve the driver when driving, e.g. to assist the driver in specific situations. What are referred to as assistance systems are used for this, said systems being able to carry out a corresponding evaluation of the signals and data on the basis of detection of the surrounding area by way of a sensor system installed in the vehicle but also by way of car-to-X communication. The evaluation is carried out either on a vehicle-internal control device or externally. Depending on the result of the evaluation and the design of the assistance system, for example warning sounds are output which are intended to warn the driver in a turning situation about e.g. a vehicle which is approaching from the side, in order to prevent a collision. Further developed assistance systems can also intervene in the control of the vehicle, e.g. by counter-steering or braking, in a subsequent stage.

In particular, a large number of methods are already known for warning against vehicles approaching from the side during turning or overtaking. For example, German Patent Application DE 10 2012 204 948 A1 discloses a method for assisting a driver when driving a vehicle, which method describes essentially an improved blind spot assistant. In the method, warnings are output in the case of a lane change only if there is a risk of a collision with a vehicle driving in the target lane. A method for assisting a driver when driving a vehicle is also proposed in German Patent Application DE 10 2012 009 297 A1. Here, driving instructions are output within the vehicle in accordance with a predicted future potential risk of a collision and/or risk of a rear-end collision between the vehicle and other road users.

However, with the known methods and systems there is still a certain probability of the driver being warned or of intervention in the control of the vehicle even though the situation would not have required it.

Therefore, an object of this invention is to make available an improved system and method, in which incorrect warnings or incorrect interventions are avoided, in particular in turning situations. This object is achieved according to the claimed invention.

A system is proposed for improving assistance systems for lateral vehicle movements during at least two-lane turning maneuvers and turning maneuvers in which the adjacent lane ends before the turning of the ego vehicle, having at least one electronic control unit, wherein the following method is carried out: successively or simultaneously a future turning maneuver of the ego vehicle is determined, information about lane markings and the number of available lanes in the surrounding area in front of and next to the ego vehicle is detected, and it is determined whether at least one further road user is in a relevant lane next to or behind the lane of the ego vehicle. And if this is the case, a future intended movement of the road user is determined from the information relating to lane markings and the number of available lanes. And if it is determined that the ego vehicle and the road user are in an at least two-lane turning lane, or that the road user stops before the turning maneuver of the ego vehicle or leaves its lane, it is determined that there is no probability of a collision.

By determining the lane guidance of the lanes next to the ego vehicle and adapting the warning behavior or intervention into the vehicle movement, the already existing assistance function of the collision warning can be expanded so that incorrect warnings are reduced in specific driving situations such as in the case of two-lane or multi-lane turning.

Furthermore, there is provision that if it is determined that there is no probability of a collision, a warning to the driver and/or an intervention into the driving movement of the ego vehicle are/is suppressed. By suppressing a collision warning, the acceptance of the assistance system by the driver is increased. Since the driver does not deactivate the assistance system owing to an excessive number of incorrect warnings, the assistance system can continue to support the driver so that the risk of an accident can be reduced.

Furthermore, there is provision that the surrounding area in front of the vehicle is sensed detected by way of a sensor system installed in the vehicle. Using an existing sensor system saves costs and resources.

Furthermore, there is provision that map information is used to make available information about the number and directions of lanes which are present. The use of map information saves computational resources, and the map information can be used to verify the data acquired by the sensor system, e.g. the forward-looking camera.

Furthermore, there is provision that in order to improve the classifiers for determining a probability of a collision a learning algorithm is used, in the training of which both chronologically continuous recordings of the driving behavior of the ego vehicle and of the driving behavior of further vehicles as well as surrounding area information are input in accordance with the classifier in question, wherein an evaluation is not made until after the completion of the turning maneuver of the ego vehicle.

Furthermore, there is provision that further surrounding area information which is determined by way of a vehicle sensor system is acquired and input into the determination of the probability of a future collision. The more information is available, the better the way in which the probability of a collision can be determined.

In addition, a computer program product is proposed for the at least one electronic control unit for carrying out the method.

In addition, a vehicle is proposed comprising the described device.

Further features and advantages of the invention emerge from the following description of exemplary embodiments of the invention, with reference to the figures of the drawing which shows details according to the invention, and from the claims. The individual features can each be implemented individually per se or a plurality thereof can be combined in any desired combination in one variant of the invention.

Preferred embodiments of the invention are explained in more detail below with reference to the appended drawings.

DETAILED DESCRIPTION OF THE DRAWINGS

In the following descriptions of the figures, identical elements and functions are provided with the same reference symbols.

Figure 1:
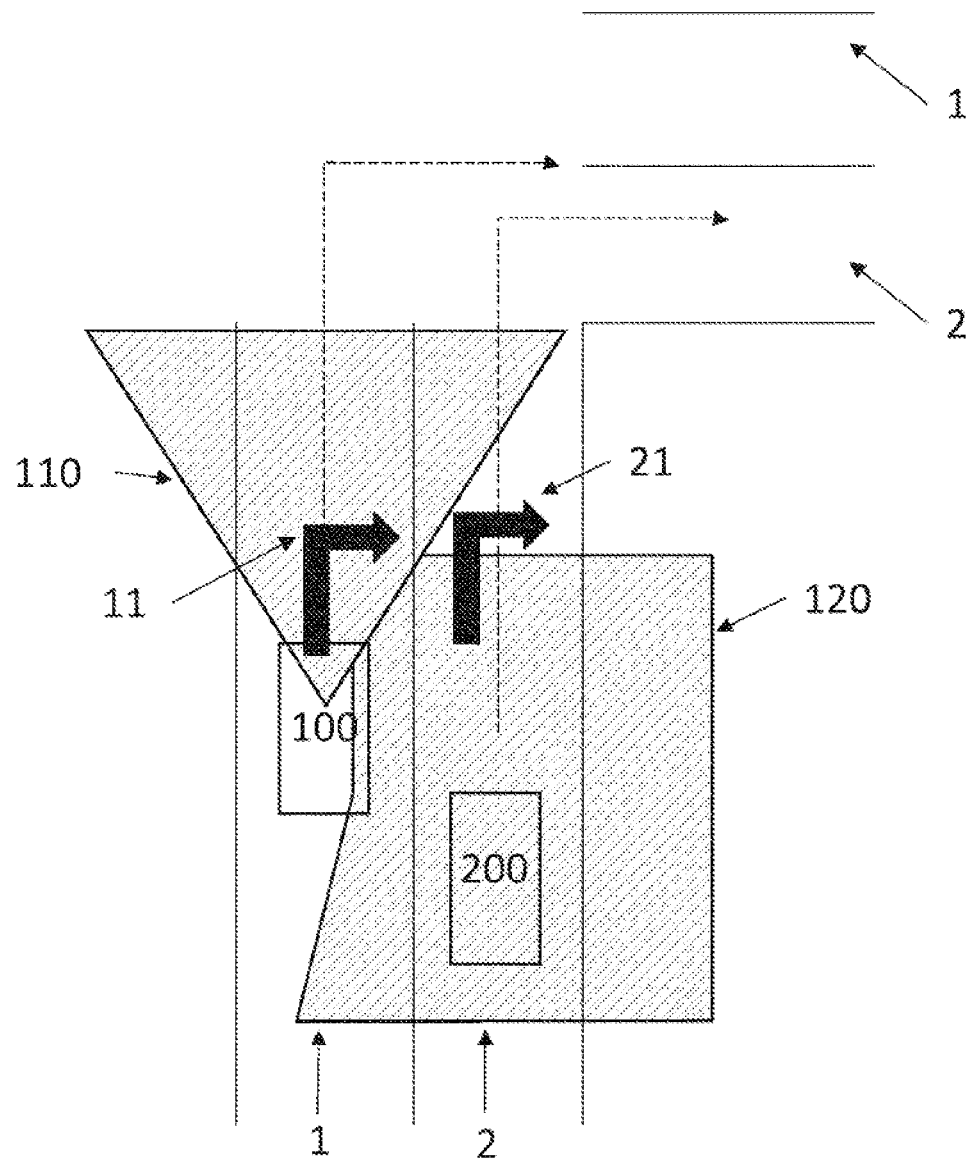
FIG. 1 shows a schematic illustration of a first situation for carrying out the method according to one embodiment of the present invention.
Figure 2:
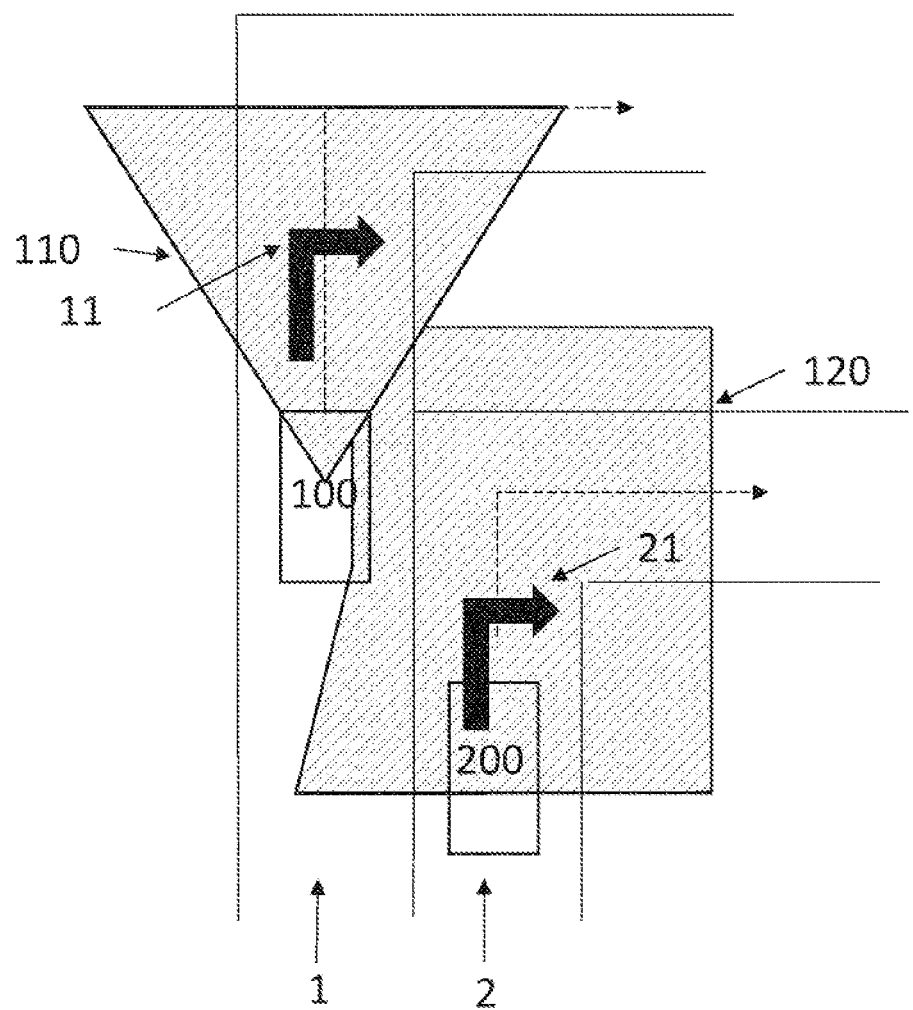
FIG. 2 shows a schematic illustration of a second situation for carrying out the method according to one embodiment of the present invention.

FIGS. 1 and 2 show two different situations in which the method as described below is implemented. FIG. 1 shows a two-lane rightward turning situation in which the ego vehicle 100 is driving in the left-hand lane 1 of the two turning lanes 1 and 2 and another road user, e.g. a further vehicle 200, is driving in the second turning lane 2, that is to say to the right of the ego vehicle 100. FIG. 2 shows a rightward turning situation in which the ego vehicle 100 is traveling in a first turning lane 1 and another road user, e.g. a further vehicle 200, is traveling in a second turning lane 2 to the right of the first turning lane 1, the second turning lane 2 ending, however, just before the first turning lane 1, so that the two vehicles 100 and 200 are not subjected to any risk of a collision. The method described below applies equally to the situations shown in FIGS. 1 and 2.

The system for improving assistance systems for lateral vehicle movements serves to warn the driver when changing lane and turning in the non-automated mode, that is to say when the driver himself is driving and using assistance systems, if further road users constitute a hazard, and conversely to suppress warnings if the other road users do not constitute a hazard, that is to say e.g. are turning off together with the ego vehicle 100 or are stopping or are turning off beforehand. Stopping can be provided, for example, for cyclists whose straight-ahead lane is regulated by a set of traffic lights in such a way that the ego vehicle can turn off to the right exclusively and without representing a hazard for the cyclists.

Assistance systems which issue a warning and which engage in instructive and controlling fashion during lane changes if there is a risk of collision with traffic which is overtaking from the rear or is located in the blind spot are already known. In the low-speed range, corresponding systems can also be used for outputting warnings when crossing paths in turning situations. An SRR (short range radar) is generally used to detect and classify objects in a crossing situation.

The configuration of corresponding assistance systems is based on simple control approaches which can lead to incorrect warnings in certain situations. This gives rise to reduced customer acceptance and can contribute to possible deactivation by the driver. That is to say when there are excessively frequent incorrect warnings there is the risk of the system being switched off or not being reacted to, which increases the risk of an accident.

For example, in the following situation an incorrect warning can be issued by previously known assistance systems. If an ego vehicle 100 is in a two-lane rightward turning situation, as shown in FIG. 1, in the left-hand lane 1, and another road user, e.g. a vehicle 200, which is driving up from behind is approaching in the right-hand lane 2, the approaching vehicle 200 is perceived as a potential risk by previously known assistance systems. A warning is issued in this situation even though a collision owing to the two-lane turning situation is improbable, if not even ruled out. Previous implementations of functions therefore cannot assess this situation correctly.

It is therefore proposed to provide improved support to the driver specifically for these situations, that is to say in particular at least two-lane turning and/or detection that the road user or the vehicle 200 in the adjacent lane stops or turns off earlier before the turning operation.

A sensor system which is installed in the ego vehicle 100, in particular forward-looking camera or cameras, and a laterally arranged sensor system for sensing the surrounding area of the ego vehicle 100 are already used for this. This is illustrated in FIGS. 1 and 2 by the hatched areas 110 and 120. In this context, the acquired data is interpreted and used for the improved detection of a hazard, that is to say in particular a risk of a collision, for the ego vehicle 100 in the current traffic situation. Furthermore, map data can be used which is stored in the ego vehicle 100 or can be obtained via a car-to-X communication.

Turning arrows and lane markings 11, 21 on the road surface are captured by way of a camera. Information about the number and directions of lanes 1, 2 which are present can also be made available by a map. A coherent assessment of the knowledge as to which lane 1, 2 the ego vehicle 100 and further road users 200 are located in and as to the direction of travel permitted in the lane 1, 2 makes it possible for incorrect warnings to be suppressed and for intervention into the driving movement by the assistance system to be prevented.

Basically, the proposed method is implemented as computer software or an algorithm on a control unit in the ego vehicle 100. The algorithm is advantageously implemented by way of e.g. a machine learning method. The objective is a warning in relevant situations, that is to say in particular two or multi-lane turning of the ego vehicle 100 when there is a risk of collision with objects to the rear, that is to say further road users, e.g. further vehicles 200. The method can therefore be applied not only in the case of two-lane turning. It can also be applied for more than two lanes if the sensor system can also monitor this space.

Two probability classifiers K1 and K2 are used for the implementation, wherein the first probability classifier K1 determines the probability of a relevant vehicle movement of the ego vehicle 100, that is to say e.g. turning, turning around, lane changing. The second probability classifier K2 attempts to estimate the risk presented by the presence of objects, that is to say further road users, e.g. further vehicles 200, for the maneuver which is detected by the ego vehicle 100. A high probability means that the future course of the object coincides with that of the ego vehicle 100. In FIG. 1, this would mean that in future both vehicles 100 and 200 wish to move e.g. in lane 2, that is to say the prevailing situation is not a two-lane or multi-lane turning situation. In such situations, there would very likely be a collision between the ego vehicle 100 and the vehicle 200 unless there were a warning or intervention. The overall algorithm inherits and rounds off the two probabilities to form an overall probability of the need for a warning, insofar as K1 is satisfied. K1 is satisfied if the ego vehicle 100 carries out lateral movements, or the determined probability for this movement is above a predefined limiting value. Only then is it necessary to take into account road users which are vulnerable in a lateral direction.

The probability classifiers K1 and K2 are configured here in such a way that in addition to the use for assessing the current situation, continuous learning is made possible by way of a training method. In this context, observations of the ego vehicle 100 are input into the first and second probability classifiers K1 and K2 in the training. Observations of the surrounding objects, that is to say e.g. of the vehicle 200, are used for the K2.

The classification which runs continuously in the ego vehicle 100 is carried out on the basis of ego data for K1 and on the basis of object data for K2. The observations in the ego vehicle 100 can be captured by way of dynamics-sensing sensors such as yaw rate sensors, torque sensors for the drive and brakes, location-sensing sensors for referencing on a map such as GNSS localization, GSM localization, landmark-based localization and sensors for sensing the state of the driver or the intention of the driver such as a driver camera, wearables, pedal and steering input sensor, state of the flashing indicator light or direction indicator.

The observations of the surrounding objects 200 are carried out on the basis of just such sensors, with the proviso that they can be transmitted by car-to-car communication or in some other way. Furthermore, the capturing of the observations is carried out by the external sensor system, such as Lidar sensors, radar sensors or camera sensors, which is located on the ego vehicle 100, depending on the equipment of the ego vehicle 100 in the scope of dynamics data, as well as intentions data, e.g. whether a flashing indicator light is set or not.

Furthermore, the following surrounding area data or surrounding area information which is acquired e.g. by the external sensor system of the ego vehicle 100 or from backend map information is captured:
traffic situation, e.g. density and flow,
weather conditions, and
current road geometry, e.g. number of lanes, lane widths, lane profile.

So that a generic use of information of the ego vehicle 100 is made possible for the K1, or a generic use of information of the observed vehicles 200 is made possible for the K2, the correspondingly captured surrounding area data is also included in the training.

For example, when there is a dense flow of traffic at a narrow intersection slower turning is necessary than when there is a low traffic volume. The method of the training is based on chronologically continuous recording of the above-mentioned features such as the behavior of the ego vehicle, behavior of the road user or users, traffic situation, weather conditions, road conditions, using the presented sensors and the automated characterization of positive situations and negative situations, with respect to the particular classification situation (K1: turning of ego vehicle, K2: collision-critical movement pattern).

The continuous improvement of the classifiers by the training can access the advantage here that observations do not have to be evaluated instantly or immediately but rather, in the specific application case, only after the conclusion of an executed action (for example turning) in the entire context.

In the example shown in FIG. 1, the ego vehicle 100 is in a two-lane turning situation in the left-hand lane 1, with a further road user 200 in the right-hand lane 2.

Basically, the classification occurs as follows: K1 classifies here the behavior of the ego vehicle 100, wherein lateral movements such as turning, turning around, lane changing are assessed as positive, and there is a negative assessment if no lateral movement is present. That is to say K1 is a precondition for the observation of K2. K1 is trained solely on the basis of ego data of the ego vehicle 100. The ego vehicle 100 therefore learns not to classify its behavior on the basis of the behavior of the other road user 200.

In the case of a positive statement from K1, i.e. a lateral movement takes place, K2 ultimately classifies a critical maneuver of other road users 200. Positive in this sense means e.g. crossing the ego lane, wherein parallel turning or stopping is negative.

K2 is trained here on the basis of data of other road users 200 and the ego data of the ego vehicle 100, i.e. if the ego vehicle 100 assumes the position of the other road users 200. The generation of the data of the other road users 200 is carried out here by way of the existing sensor system of the ego vehicle 100 as well as via car-to-car communication with the road users 200.

Therefore, the ego vehicle 100 can generate, evaluate and classify data either for the situation in which it is traveling (in this example) in the left-hand lane 1, or in which it is traveling in the right-hand lane as a road user 200. Therefore, it can learn from its own behavior how it can or should behave in such a situation in the left-hand lane 1.

To make a generic use of information of the ego vehicle 100 possible for the K2, the observations generated by the possibly deviating sensing sensors must be reduced by the magnitude of their errors.

The examples relate to vehicles which are in the right-hand traffic, but can also be applied analogously to left-hand traffic. The basic principle is that an adjacent lane of the ego vehicle is present, and the aim is to detect whether it exhibits the same driving profile as the ego lane, so that multi-lane turning is provided.

What is claimed is:

1. A system for improving assistance systems for lateral vehicle movements during at least two-lane turning maneuvers and turning maneuvers in which an adjacent lane ends before turning of an ego vehicle, the system comprising:
   one electronic control unit, wherein the control unit is configured such that, successively or simultaneously:
      a future turning maneuver of the ego vehicle is determined,
      information about lane markings and a number of available lanes in a surrounding area in front of and next to the ego vehicle is detected, and
      it is determined whether at least one further road user is in a relevant lane next to or behind the lane of the ego vehicle, and
   upon determining that the at least one further road user is in the relevant lane next to or behind the lane of the ego vehicle, a future intended movement of the road user is determined from the information about the lane markings and the number of available lanes, and upon determining that the ego vehicle and the road user are in different lanes of an at least two-lane turning lane, that the road user stops before a turning maneuver of the ego vehicle, or that the road user leaves a lane of the road user, it is determined that there is no probability of a collision, wherein:
   a learning algorithm is used in order to improve classifiers for determining the probability of the collision,
   in training of the learning algorithm, chronologically continuous recordings of driving behavior of the ego vehicle, as well as surrounding area information, are input to a first classifier,
   in training of the learning algorithm, the chronologically continuous recordings of driving behavior of the ego vehicle and chronologically continuous recordings of driving behavior of further vehicles, as well as the surrounding area information, are input to a second classifier,
   an evaluation is made after completion of the turning maneuver of the ego vehicle,
   the first classifier classifies the driving behavior of the ego vehicle, and
   the second classifier classifies the driving behavior of the road user upon a determination by the first classifier that a lateral movement of the ego vehicle is present.

2. The system according to claim 1, wherein upon determining that there is no probability of a collision, at least one of a warning to the driver or an intervention into a driving movement of the ego vehicle is suppressed.

3. The system according to claim 1, wherein the surrounding area in front of the vehicle is detected as surrounding area information by a sensor system installed in the ego vehicle.

4. The system according to claim 3, wherein the surrounding area information comprises information about at least one of a traffic situation, weather conditions, or a current road geometry.

5. The system according to claim 1, wherein map information is used to make available information about the number and directions of lanes that are present.

6. A vehicle comprising the system according to claim 1.

7. A method for improving assistance systems for lateral vehicle movements during at least two-lane turning maneuvers and turning maneuvers in which an adjacent lane ends before turning of an ego vehicle, the method comprising:
  successively or simultaneously:
    determining a future turning maneuver of the ego vehicle,
    detecting information about lane markings and a number of available lanes in a surrounding area in front of and next to the ego vehicle, and
    determining whether at least one further road user is in a relevant lane next to or behind the lane of the ego vehicle, and
  upon determining that at least one further road user is in the relevant lane next to or behind the lane of the ego vehicle, a future driving task of the road user is determined from the information about the lane markings and the number of available lanes, and upon determining that the ego vehicle and the road user are in different lanes of an at least two-lane turning lane, or that the road user leaves a lane of the road user before the turning maneuver of the ego vehicle, it is determined that there is no probability of a collision, wherein:
  a learning algorithm is used in order to improve classifiers for determining the probability of the collision,
  in training of the learning algorithm, chronologically continuous recordings of driving behavior of the ego vehicle, as well as surrounding area information, are input to a first classifier,
  in training of the learning algorithm, the chronologically continuous recordings of driving behavior of the ego vehicle and chronologically continuous recordings of driving behavior of further vehicles, as well as the surrounding area information, are input to a second classifier,
  an evaluation is made after completion of the turning maneuver of the ego vehicle,
  the first classifier classifies the driving behavior of the ego vehicle, and
  the second classifier classifies the driving behavior of the road user upon a determination by the first classifier that a lateral movement of the ego vehicle is present.

8. A computer program product comprising a non-transitory computer readable medium having stored thereon program code which, when executed on a processor, carries out the acts of:
  successively or simultaneously:
    determining a future turning maneuver of the ego vehicle,
    detecting information about lane markings and a number of available lanes in a surrounding area in front of and next to the ego vehicle, and
    determining whether at least one further road user is in a relevant lane next to or behind the lane of the ego vehicle, and
  upon determining that at least one further road user is in the relevant lane next to or behind the lane of the ego vehicle, a future driving task of the road user is determined from the information about the lane markings and the number of available lanes, and upon determining that the ego vehicle and the road user are in different lanes of an at least two-lane turning lane, or that the road user leaves a lane of the road user before the turning maneuver of the ego vehicle, it is determined that there is no probability of a collision, wherein:
  a learning algorithm is used in order to improve classifiers for determining the probability of the collision,
  in training of the learning algorithm, chronologically continuous recordings of driving behavior of the ego vehicle, as well as surrounding area information, are input to a first classifier,
  in training of the learning algorithm, the chronologically continuous recordings of driving behavior of the ego vehicle and chronologically continuous recordings of driving behavior of further vehicles, as well as the surrounding area information, are input to a second classifier,
  an evaluation is made after completion of the turning maneuver of the ego vehicle,
  the first classifier classifies the driving behavior of the ego vehicle, and
  the second classifier classifies the driving behavior of the road user upon a determination by the first classifier that a lateral movement of the ego vehicle is present.

* * * * *